(12) United States Patent
Pene et al.

(10) Patent No.: US 12,027,716 B2
(45) Date of Patent: Jul. 2, 2024

(54) ELECTRIC GENERATOR COMPRISING A PLURALITY OF ELECTRIC ACCUMULATORS AND AT LEAST ONE HEAT-SINK DEVICE INCORPORATING A PHASE-CHANGE MATERIAL

(71) Applicants: Airbus Operations SAS, Toulouse (FR); Airbus Operations GmbH, Hamburg (DE)

(72) Inventors: Philippe Pene, Toulouse (FR); Thomas Scherer, Hamburg (DE)

(73) Assignees: Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 321 days.

(21) Appl. No.: 17/524,448

(22) Filed: Nov. 11, 2021

(65) Prior Publication Data
US 2022/0158286 A1    May 19, 2022

(30) Foreign Application Priority Data

Nov. 16, 2020   (FR) ...................................... 2011707

(51) Int. Cl.
| | |
|---|---|
| *H01M 50/00* | (2021.01) |
| *A62C 3/16* | (2006.01) |
| *A62C 37/11* | (2006.01) |
| *H01M 10/613* | (2014.01) |
| *H01M 10/6556* | (2014.01) |
| *H01M 10/6557* | (2014.01) |

(Continued)

(52) U.S. Cl.
CPC ............... *H01M 50/22* (2021.01); *A62C 3/16* (2013.01); *A62C 37/11* (2013.01); *H01M 10/613* (2015.04); *H01M 10/6556* (2015.04); *H01M 10/6557* (2015.04); *H01M 10/6568* (2015.04); *H01M 10/6569* (2015.04)

(58) Field of Classification Search
CPC ............... H01M 50/22; H01M 10/613; H01M 10/6556; H01M 10/6557; H01M 10/6568; H01M 10/6569; H01M 10/625; H01M 10/643; H01M 10/62; A62C 3/16; A62C 37/11; Y02E 60/10; Y02E 60/14
See application file for complete search history.

(56) References Cited

U.S. PATENT DOCUMENTS 9,865,907 B2 *   1/2018   Xiang ............... H01M 10/6563
2011/0293986 A1   12/2011   Kozu
(Continued)

FOREIGN PATENT DOCUMENTS

FR           3077683 A1    8/2019

OTHER PUBLICATIONS

Wikipedia [Rechargeable Battery'} (Year: 2023).*
(Continued)

*Primary Examiner* — Cynthia H Kelly
*Assistant Examiner* — Monique M Wills
(74) *Attorney, Agent, or Firm* — Greer, Burns & Crain, Ltd.

(57) ABSTRACT

An electric generator including a number of electric accumulators and at least one heat-sink device using a phase-change material configured to pick up the excessive thermal energy produced by one of the electric accumulators and change phase in order to absorb a large quantity of thermal energy in the form of latent heat.

7 Claims, 3 Drawing Sheets

(51) Int. Cl.
*H01M 10/6568* (2014.01)
*H01M 10/6569* (2014.01)
*H01M 50/22* (2021.01)

(56) References Cited

U.S. PATENT DOCUMENTS

2016/0380247 A1* 12/2016 Juzkow ............... H01M 50/204
429/99
2018/0083330 A1 3/2018 Xiang
2020/0058967 A1* 2/2020 Berge .................. H01M 50/211

OTHER PUBLICATIONS

Engineering Toolbox [Ethylene Glycol Heat Transfer Fluid Properties'] (Year: 2023).*
French Search Report; priority document.

* cited by examiner

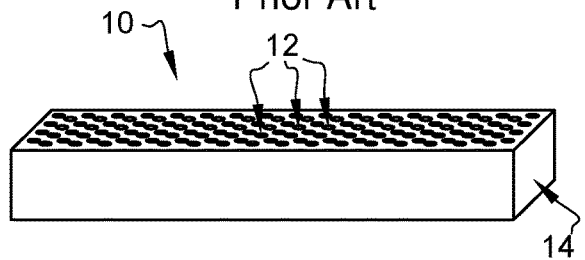
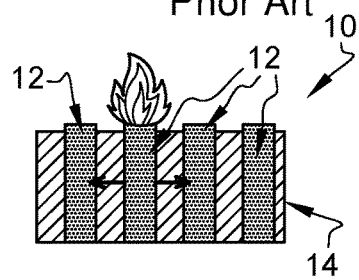
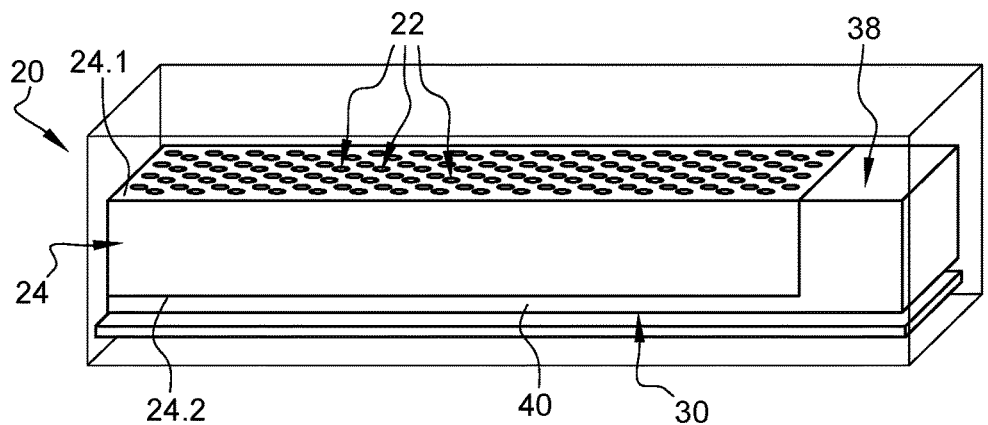
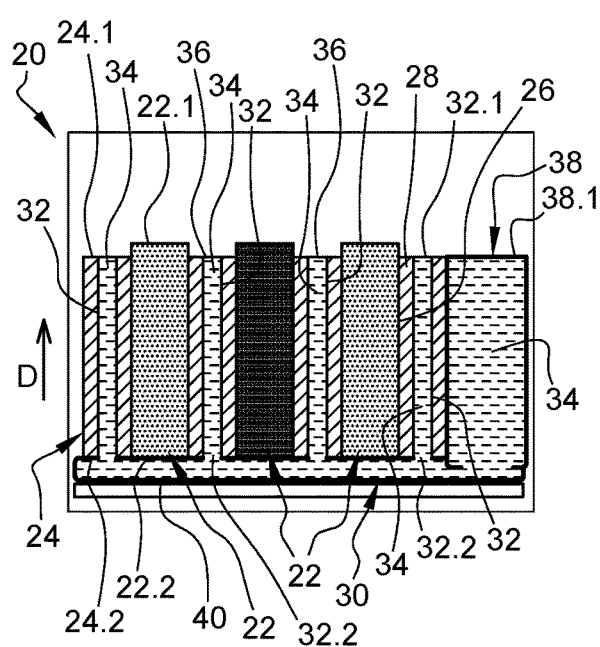
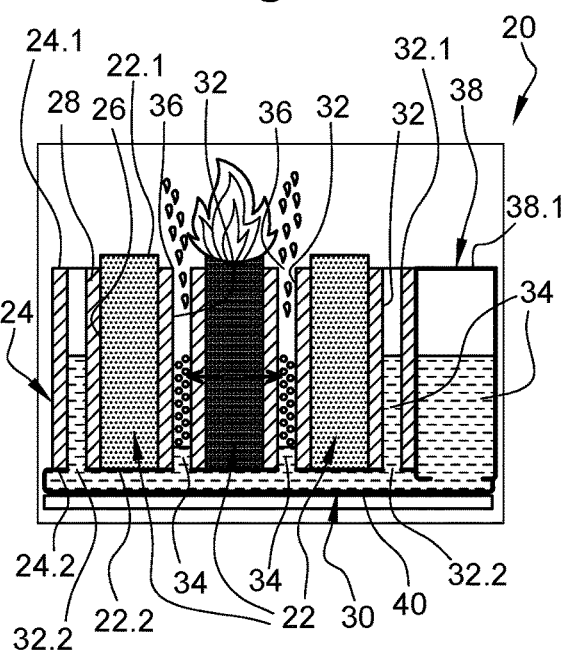

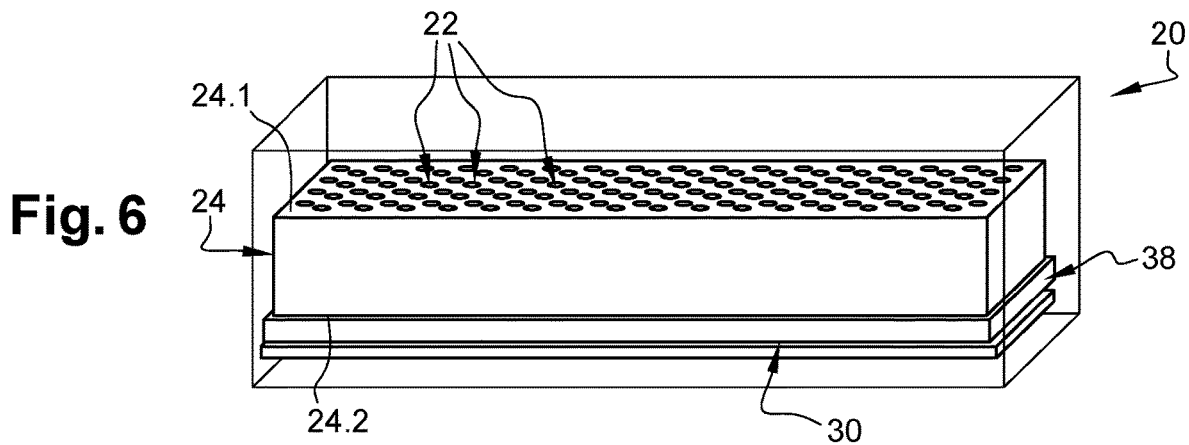
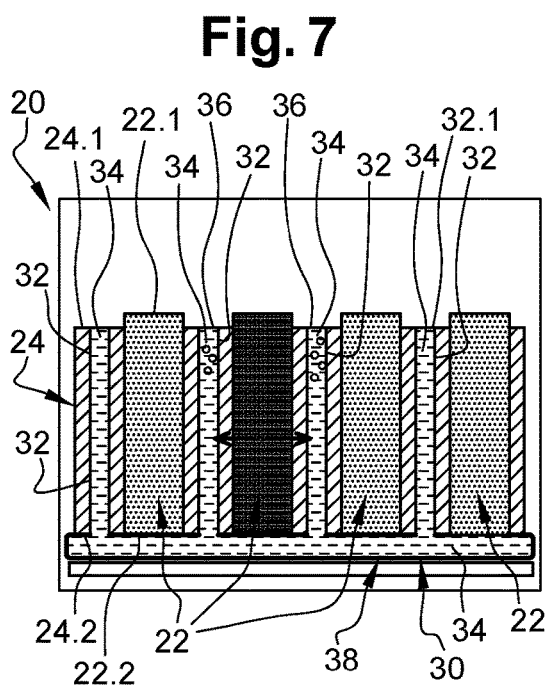 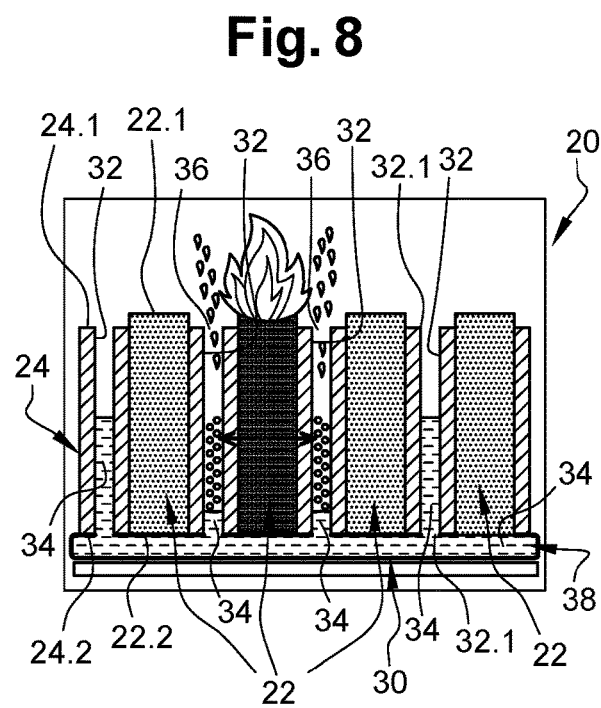
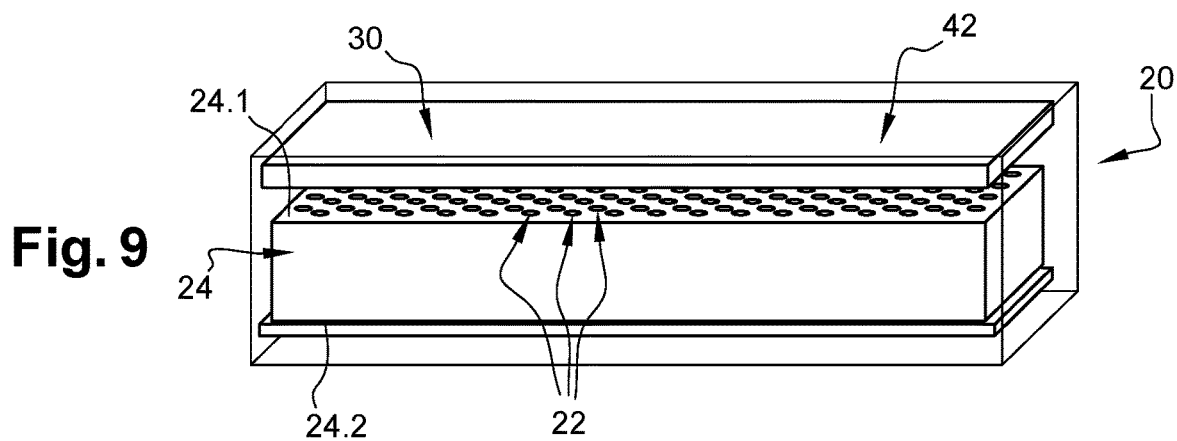

ELECTRIC GENERATOR COMPRISING A PLURALITY OF ELECTRIC ACCUMULATORS AND AT LEAST ONE HEAT-SINK DEVICE INCORPORATING A PHASE-CHANGE MATERIAL

CROSS-REFERENCES TO RELATED APPLICATIONS

This application claims the benefit of the French patent application No. 2011707 filed on Nov. 16, 2020, the entire disclosures of which are incorporated herein by way of reference.

FIELD OF THE INVENTION

The present application relates to an electric generator comprising a plurality of electric accumulators and at least one heat sink device incorporating a phase-change material.

BACKGROUND OF THE INVENTION

According to an embodiment, that can be seen in FIGS. 1 and 2, an electric generator 10 comprises a plurality of electric accumulators 12, for example of cylindrical forms, grouped together so as to form a parallelepipedal module 14, several modules 14 being able to be grouped together so as to form a battery. According to a nonlimiting application, such an electric generator 10 is positioned and used in an aircraft.

As illustrated in FIG. 2, in the event of malfunction, one of the electric accumulators 12 can create a temperature rise which, if it is too great, can provoke the damage thereof and a temperature rise of the electric accumulators nearby. The propagation of this temperature rise from one electric accumulator to another, step by step, can generate a thermal runaway.

SUMMARY OF THE INVENTION

The present invention aims to reinforce the capacity of an electric generator comprising a plurality of electric accumulators to limit the propagation of the heat from one electric accumulator to another.

To this end, a subject of the invention is an electric generator comprising a number of electric accumulators and at least one heat-sink device, each electric accumulator operating over a range of operating temperatures bounded by lower and upper values and having a critical temperature beyond which the electric accumulator can be damaged, the heat-sink device comprising at least one container comprising a phase-change material, the container being positioned above at least one electric accumulator, the phase-change material having a phase-change temperature lying between the upper value of the range of operating temperatures of the electric accumulator and the critical temperature of the electric accumulator.

According to the invention, the container is delimited by at least one wall oriented toward the electric accumulator and produced from a material having a melting temperature higher than or equal to the upper value of the range of operating temperatures of the electric accumulator and lower than or equal to the critical temperature of the electric accumulator.

When the release of heat produced by an electric accumulator is too great and risks damaging another electric accumulator, the phase-change material close to the electric accumulator picks up the heat and changes phase which entails the absorption of a large quantity of thermal energy in the form of latent heat.

According to another feature, at the phase-change temperature, the phase-change material is configured to transition from a liquid state to a gaseous state.

According to another feature, the melting temperature is lower than the phase-change temperature of the phase-change material.

According to another feature, the upper value of the range of operating temperatures of the electric accumulator is lower than or equal to 80° C.

According to another feature, the critical temperature of the electric accumulator lies between 120° C. and 140° C.

According to another feature, the phase-change material is water.

BRIEF DESCRIPTION OF THE DRAWINGS

Other features and advantages will emerge from the following description of the invention, a description given purely by way of example, in light of the attached drawings in which:

FIG. 1 is a perspective schematic representation of a module of an electric generator comprising electric accumulators illustrating an embodiment of the prior art, FIG. 2 is a cross section of the module that can be seen in FIG. 1, FIG. 3 is a perspective schematic representation of module of an electric generator comprising electric accumulators equipped with a heat-sink device illustrating a first embodiment of the invention, FIG. 4 is a cross section of the module that can be seen in FIG. 3 before a change of phase of a phase-change material of the heat-sink device, FIG. 5 is a cross section of the module that can be seen in FIG. 3 after the change of phase of the phase-change material of the heat-sink device, FIG. 6 is a perspective schematic representation of a module of an electric generator comprising electric accumulators and equipped with a heat-sink device illustrating a second embodiment of the invention, FIG. 7 is a cross section of the module that can be seen in FIG. 6 before a change of phase of a phase-change material of the heat-sink device, FIG. 8 is a cross section of the module that can be seen in FIG. 6 after the change of phase of the phase-change material of the heat-sink device, FIG. 9 is a perspective schematic representation of a module of an electric generator comprising electric accumulators and equipped with a heat-sink device illustrating a third embodiment of the invention.

DETAILED DESCRIPTION OF THE PREFERRED EMBODIMENTS

Figure 10:
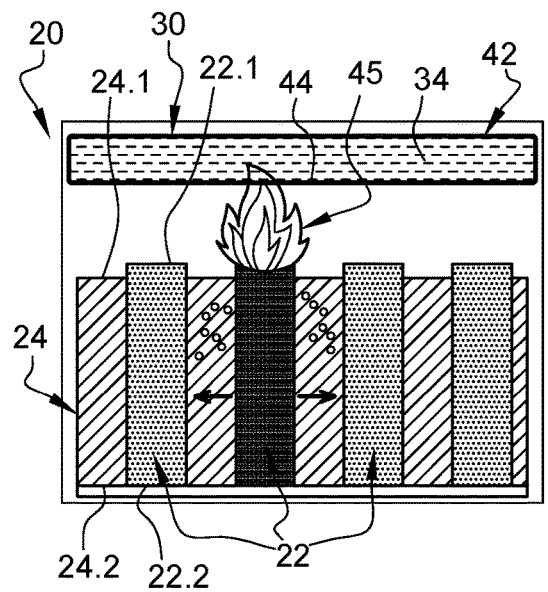
FIG. 10 is a cross section of the module that can be seen in FIG. 9 before a change of phase of a phase-change material of the heat-sink device.

As illustrated in FIGS. 3 to 13, an electric generator 20 comprises a plurality of electric accumulators 22 linked together so as to create a battery of electric accumulators. According to one configuration, each electric accumulator 22 is cylindrical, oriented in a first direction D corresponding generally to the vertical direction in operation and has first and second end faces 22.1, 22.2. According to another configuration that is not represented, the electric accumulators 22 are of prismatic, polygonal or any other form.

The electric accumulators 22 are all identical and grouped together so as to form a module 24, several modules 24 being able to be grouped together so as to form an electric generator 20. According to a nonlimiting application, such an electric generator 20 is positioned and used in an aircraft.

According to one configuration, each module 24 has a substantially parallelepipedal form and has first and second faces 24.1, 24.2 that are parallel to one another, the first end faces 22.1 of the electric accumulators 22 being parallel and close to the first face 24.1 of the module 24, the second end faces 22.2 of the electric accumulators 22 being parallel and close to the second face 24.2 of the module 24. Generally, the first and second faces 24.1, 24.2 of the module 24 are approximately horizontal, the first and second faces 24.1, 24.2 of the module 24 being oriented respectively upward and downward.

According to one embodiment, each electric accumulator 22 is jacketed by a strip of material 26 limiting the thermal propagation from the inside to the outside of each electric accumulator 22 and the electric accumulators 22 are separated by a thermally insulating material 28 which limits the speed of thermal propagation between the electric accumulators 22.

Each electric accumulator 22 is configured to operate ideally over a range of operating temperatures bounded by lower and upper values. To limit any risk of damage, the temperature of each electric accumulator must not exceed a critical temperature. To give an order of magnitude, the upper value of the range of operating temperatures is lower than or equal to 80° C. and the critical temperature lies between 120 and 140° C.

The electric accumulators 22, the strip of material 26 surrounding them and the thermally insulating material 28 are not described further because they are known to the person skilled in the art. The same applies for the other elements of the electric generator 20, for example for regulating the voltage and/or current and/or temperature parameters.

The electric generator 20 comprises a heat-sink device 30 configured to pick up any heat generated by an electric accumulator 22 and dissipate it.

According to the embodiments visible in FIGS. 3 to 11, the heat-sink device 30 comprises at least one container 32, 42 of a phase-change material 34 positioned in proximity to at least one electric accumulator 22. The phase-change material 34 is chosen so as to have a phase-change temperature higher than or equal to the upper value of the range of operating temperatures of the electric accumulator 22 and lower than or equal to the critical temperature of the electric accumulator 22.

According to another feature, the phase-change material 34 is liquid and becomes gaseous when it has a temperature higher than its phase-change temperature. In the gaseous state, the phase-change material naturally expels the heat out of and above the module 24.

According to one embodiment, the phase-change material 34 is water and has a phase-change temperature of the order of 100° C. (at atmospheric pressure). The phase-change material 34 can also be a mixture of water and at least one additive.

"In proximity" is understood to mean that the container 32 is sufficiently close to a first electric accumulator 22 for the heat emitted by a first electric accumulator 22 to be picked up by the phase-change material 34 contained in the container 32 before reaching and heating up another electric accumulator adjacent to the first electric accumulator 22.

The heat transfer between the electric accumulators 22 and the phase-change material 34 makes it possible to limit the temperature of the heat-sink device 30. Furthermore, the thermal insulation of the electric accumulators 22 by means of a strip of material 26 and a thermally insulating material 28 makes it possible to limit the quantity of phase-change material, the speed of propagation and the uncertainties of the thermal propagation process resulting from an unpredictable behavior of the electric accumulators 22.

According to first and second embodiments that can be seen in FIGS. 3 to 8, the heat-sink device 30 comprises several containers 32 positioned between the electric accumulators 22. According to one configuration, each container 32 has a cylindrical form having an axis approximately parallel to the first direction D and a diameter smaller than or equal to that of the electric accumulators 22. According to another configuration, each container 32 has a prismatic, polygonal or any other form. More generally, each container 32 has a form similar to that of an electric accumulator 22, which makes it possible to limit the distance between the phase-change material and the walls of the electric accumulator. That makes it possible to secure heat transfer between an electric accumulator and the phase-change material. As illustrated in FIGS. 4, 5, 7 and 8, each container 32 is positioned between and equidistant from two adjacent electric accumulators 22.

According to the first and second embodiments, each container 32 has at least one vent 36, positioned at its top part 32.1, emerging on the first face 24.1 of the module 24, to evacuate the gaseous phase of the phase-change material 34 out of and above the module 24. According to one configuration, when each container 32 takes the form of a cylinder, its end 32.1 oriented upward in operation (close to the first face 24.1 of the module 24) is open and forms a vent 36. As illustrated in FIGS. 5 and 8, this vent 36 makes it possible to evacuate the gaseous phase of the phase-change material 34 upon its change of phase and thus dissipate the heat out of the module 24. The evacuation of the gaseous phase of the phase-change material through the vent also allows the liquid phase of the phase-change material to enter into contact with the electric accumulator 22 that is in thermal runaway condition.

According to the first and second embodiments, the heat-sink device 30 comprises a supply of phase-change material 34 to supply at least one of the containers 32 in order to at least partially compensate for the evaporation of the phase-change material 34 of the container 32 when the latter evaporates.

According to the first and second embodiments, the heat-sink device 30 comprises at least one tank 38, containing the phase-change material 34, to which several containers 32 are linked. This solution makes it possible to supply the containers 32 linked to the tank 38 with phase-change material 34 when the latter changes phase and becomes gaseous in one of the containers 32. According to one configuration, all the containers 32 of one and the same module 24 are linked to the same tank 38.

According to a first variant, the heat-sink device 30 comprises an active transfer system for transferring the phase-change material 34 from the tank 38 to at least one container 32. According to a second variant, the heat-sink device 30 comprises a passive transfer system for transferring the phase-change material 34 from the tank 38 to at least one container 32. Unlike an active transfer system, the passive transfer system ensures a transfer of the phase-change material 34 without the input of energy.

According to the first embodiment that can be seen in FIGS. 3 to 5, the tank 38 extends approximately over the entire height of the module 24 and its top part 38.1 is substantially at the same height as the top part 32.1 of each container 32. In addition, the heat-sink device 30 comprises at least one duct 40 linking the tank 38 and the containers 32.

According to one configuration, the tank 38 is attached to one of the lateral faces of the parallelepipedal module 24 and the heat-sink device 30 comprises a single duct 40 which extends approximately over the entire second face 24.2 of the module 24, the containers 32 and the tank 38 being positioned above the duct 40, the bottom ends 32.2 of the containers 32 connecting with the duct 40.

According to the second embodiment that can be seen in FIGS. 6 to 8, the tank 38 extends under approximately the entire surface of the second face 24.2 of the module 24. The containers 32 are positioned above the tank 38 and their bottom ends 32.2 connect directly with the tank 38.

According to the first and second embodiments, a passive transfer of the phase-change material 34 from the tank 38 to the containers 32 is obtained.

The principle of operation of the first and second embodiments is now described.

When one electric accumulator 22 generates a temperature rise higher than the upper value of its range of operating temperatures, that provokes, around the electric accumulator 22, an increase in temperature. The phase-change material 34 contained in at least one of the containers 32, close to the electric accumulator 22, picks up some of the heat emitted by the electric accumulator 22 which results in a temperature rise of the phase-change material 34 in liquid phase, as illustrated in FIGS. 4 and 7. When the release of heat produced by the electric accumulator 22 is greater, the phase-change material 34 reaches its phase-change temperature and changes phase to become gaseous, as illustrated in FIGS. 5 and 8. The evaporation of the phase-change material 34 generates an absorption of a large quantity of thermal energy in the form of latent heat. Moreover, the fact that the phase-change material 34 in gaseous form escapes via the vent 36 makes it possible to dissipate the heat produced by the electric accumulator 22 out of the module 24. The fact that the container 32 is linked to a tank 38 containing the phase-change material 34 and has a vent 36 makes it possible to change the phase-change material 34 as it evaporates, which contributes to increasing the quantity of heat absorbed and dissipated.

According to a third embodiment, the heat sink device 30 comprises at least one container 42, positioned above at least one electric accumulator 22, and generally several electric accumulators 22. According to one configuration, one and the same container 42 is positioned above the module 24 and extends approximately over the entire surface of the first face 24.1 of the module 24.

The container 42 is slightly separated from the first ends 22.1 of the electric accumulators 22. According to one configuration, the container 42 is separated from the first ends 22.1 of the electric accumulators 22 by a predetermined distance lying between a minimum distance and a maximum distance. The minimum distance is determined by the space needed to evacuate a hot gas exiting from the electric accumulator and the gaseous phase of the phase-change material. The maximum distance is determined by the maximum distance between the first end 22.1 and the container 42 which allows the container to be penetrated by melting in order to start the flow of the phase-change material on or in the electric accumulator.

The container 42 is delimited by at least one wall 44 oriented toward the electric accumulator or accumulators 22 made of a material having a melting temperature higher than or equal to the upper value of the range of operating temperatures of the electric accumulator 22 and lower than or equal to the critical temperature of the electric accumulator 22. According to a feature of the invention, the melting temperature is lower than the phase-change temperature of the phase-change material 34. The wall 44 and its material are configured so that, when the wall 44 has a temperature higher than or equal to the melting temperature, it is punctured and allows the phase-change material 34 to flow out of the container 42 in a zone 45 close to and above the electric accumulator 22.

Thus, when the heat generated by the electric accumulator 22 generates a temperature rise at the wall 44, vertically in line with the electric accumulator 22, higher than the melting temperature, that provokes a puncturing 46 of the wall 44 which then allows the phase-change material 34 to flow out of the container 42 above the electric accumulator 22, in a zone 45 close to the electric accumulator 22.

The container 42 can be compartmented to regulate the quantity of phase-change material 34 exiting through the puncture 46.

Figure 11:
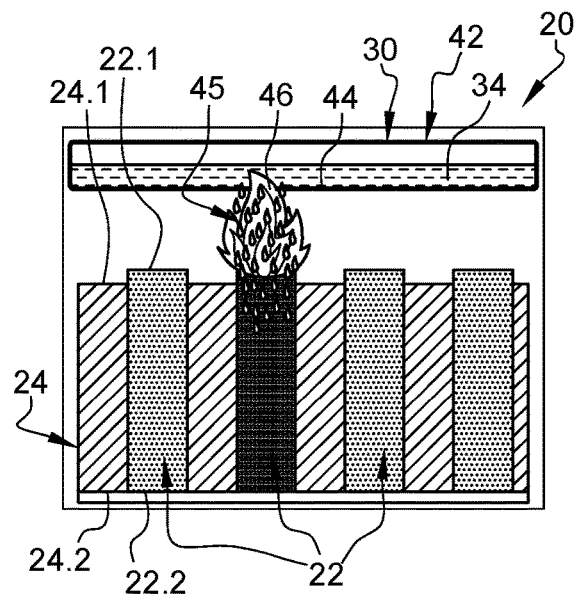
FIG. 11 is a cross section of the module that can be seen in FIG. 9 after the change of phase of the phase-change material of the heat-sink device.

The principle of operation of the third embodiment is now described in light of FIGS. 9 to 11.

When an electric accumulator 22 generates a temperature rise higher than the upper value of its range of operating temperatures, that provokes a temperature rise at the wall 44, vertically in line with the electric accumulator 22, higher than the melting temperature, provoking the puncturing of the wall 44 vertically in line with the electric accumulator 22. Consequently, the phase-change material 34 in liquid form flows into the zone 45 situated above the electric accumulator 22. The temperature in the zone 45 situated above the electric accumulator 22 is such that the phase-change material 34 changes phase and evaporates generating an absorption of a large quantity of thermal energy in the form of latent heat. Since the phase-change material 34 in gaseous form tends to rise above the module 24, it allows the heat produced by the electric accumulator 22 to be dissipated out of the module 24.

Figure 12:
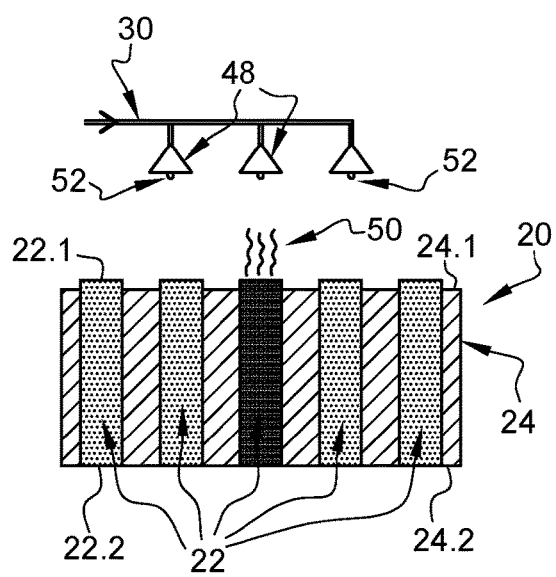
FIG. 12 is a cross section of a module of an electric generator comprising electric accumulators and equipped with a heat-sink device comprising a system for distributing the phase-change material in the deactivated state.
Figure 13:
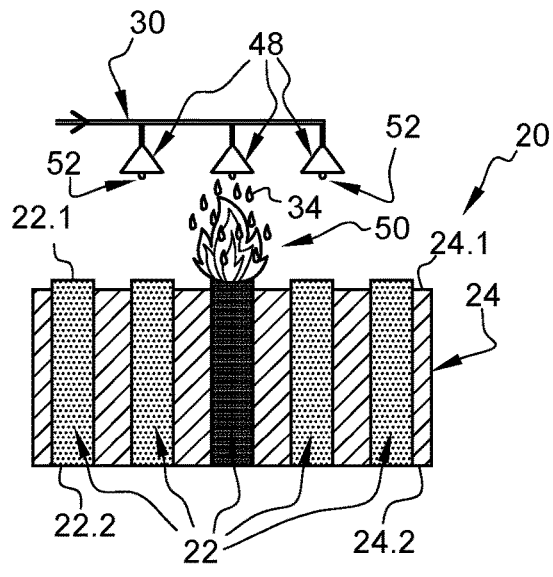
FIG. 13 is a cross section of the module that can be seen in FIG. 12, the system for distributing phase-change material being in the activated state.

According to a fourth embodiment that can be seen in FIGS. 12 and 13, the heat-sink device 30 comprises a system 48 for distributing the phase-change material 34 configured to supply a zone 50 close to an electric accumulator 22 with phase-change material 34 when the zone 50 reaches a triggering temperature corresponding to a temperature for the electric accumulator 22 lying between the upper value of its range of operating temperatures and the critical temperature of the electric accumulator 22. This distribution system 48 is configured to be in a deactivated state in which the distribution system 48 does not supply the zone 50 close to an electric accumulator 22 with phase-change material 34 when the temperature of the zone 50 is lower than the triggering temperature and an activated state in which the distribution system 48 supplies the zone 50 close to an electric accumulator 22 with phase-change material 34 when the temperature of the zone 50 is higher than or equal to the triggering temperature, an activation of the distribution system 48 corresponding to a transition from the deactivated state to the activated state. The zone 50 is situated above at least one electric accumulator 22.

According to one configuration, the heat-sink system 30 comprises at least one distribution system 48 positioned above at least one electric accumulator 22. Generally, the heat-sink system 30 comprises several distribution systems 48, each positioned above several electric accumulators 22.

In addition, the heat-sink device 30 comprises a triggering system 52 configured to be in a first state when the temperature of the zone 50 is lower than the triggering temperature and a second state when the temperature of the zone 50 is higher than or equal to the triggering temperature, a transition from the first state to the second state of the triggering system 52 provoking the activation of the phase-change material 34 distribution system 48. According to one configuration, the first state corresponds to a solid state and the second state to a molten state.

As for the first, second and third embodiments, the phase-change material 34 is liquid and becomes gaseous when it has a temperature higher than its phase-change temperature. According to one embodiment, the phase-change material 34 is water and has a phase-change temperature of the order of 100° C. (at atmospheric pressure). The phase-change material 34 can also be a mixture of water and at least one additive. Thus, in case of activation of the distribution system 48, a zone 50 close to the electric accumulator 22 generating an overheating is supplied with phase-change material 34. The temperature in the zone 50, above the electric accumulator 22, is such that the phase-change material 34 changes phase and evaporates generating an absorption of a large quantity of thermal energy in the form of latent heat. Since the phase-change material 34 in the gaseous state tends to rise above the module 24, it allows the heat produced by the electric accumulator 22 to be dissipated out of the module 24.

Whatever the embodiment, the heat-sink device 30 comprises a phase-change material 34 in a zone close to at least one electric accumulator 22 liable to generate a temperature rise, the phase-change material 34 having a phase-change temperature lying between the upper value of the range of operating temperatures of the electric accumulator 22 and the critical temperature. The phase-change material 34 transitions from a liquid state to a gaseous state at the phase-change temperature.

In case of overheating of the electric accumulator 22, the temperature in the zone is such that the phase-change material 34 changes phase and evaporates generating an absorption of a large quantity of thermal energy in the form of latent heat. Since the phase-change material 34 in the gaseous state tends to rise above the module 24, it allows the heat produced by the electric accumulator 22 to be dissipated out of the module 24 and to be moved away from the module 24.

According to the first and second embodiments, the phase-change material 34 contained in a container 32 close to the electric accumulator 22 is present in the zone 50 even if the electric accumulator 22 does not generate a temperature rise.

According to the third and fourth embodiments, the zone 50 is supplied with phase-change material 34 only when the zone 45, 50 reaches a triggering or melting temperature.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric generator comprising:
a number of electric accumulators, each electric accumulator being jacketed by a strip of material limiting a thermal propagation from an inside to an outside of each electric accumulator and wherein the electric accumulators are separated by a thermally insulating material,
at least one heat-sink device,
each electric accumulator operating over a range of operating temperatures bounded by lower and upper values and having a critical temperature beyond which the electric accumulator can be damaged,
the heat-sink device comprising at least one container comprising a phase-change material,
the container being positioned above at least one electric accumulator,
the phase-change material having a phase-change temperature lying between the upper value of the range of operating temperatures of the electric accumulator and the critical temperature of the electric accumulator,
the container being delimited by at least one wall oriented toward the electric accumulator and produced from a material having a melting temperature higher than or equal to the upper value of the range of operating temperatures of the electric accumulator and lower than or equal to the critical temperature of the electric accumulator.

2. The electric generator as claimed in claim 1, wherein, at the phase-change temperature, the phase-change material is configured to transition from a liquid state to a gaseous state.

3. The electric generator as claimed in claim 1, wherein the melting temperature is lower than the phase-change temperature of the phase-change material.

4. The electric generator as claimed in claim 1, wherein the upper value of the range of operating temperatures of the electric accumulator is lower than or equal to 80° C.

5. The electric generator as claimed in claim 1, wherein the critical temperature of the electric accumulator lies between 120° C. and 140° C.

6. The electric generator as claimed in claim 1, wherein the phase-change material comprises water.

7. The electric generator as claimed in claim 6, wherein the phase-change material includes at least one additive.

* * * * *